United States Patent [19]

Nguyen et al.

[11] Patent Number: 4,797,817

[45] Date of Patent: Jan. 10, 1989

[54] SINGLE CYCLE STORE OPERATIONS IN A VIRTUAL MEMORY

[75] Inventors: Chinh K. Nguyen, San Diego; Charles A. Flicek, Escondido, both of Calif.

[73] Assignee: NCR Corporation, Dayton, Ohio

[21] Appl. No.: 940,315

[22] Filed: Dec. 10, 1986

[51] Int. Cl.[4] .......................... G06F 9/00; G06F 9/30; G06F 9/38; G06F 9/06

[52] U.S. Cl. .................................................. 364/200

[58] Field of Search ... 364/200 MS File, 900 MS File, 364/300, 30

[56] References Cited

U.S. PATENT DOCUMENTS

| | | | |
|---|---|---|---|
| 3,742,457 | 6/1973 | Calle et al. | 364/200 |
| 3,781,808 | 12/1973 | Ahearn et al. | 364/200 |
| 3,840,861 | 10/1974 | Mindahl et al. | 364/200 |
| 4,161,026 | 7/1979 | Wilhite | 364/200 |
| 4,253,183 | 2/1981 | Taylor et al. | 364/200 |
| 4,298,927 | 11/1981 | Berglund et al. | 364/200 |
| 4,315,313 | 2/1982 | Armstrong et al. | 364/200 |
| 4,332,010 | 5/1982 | Messina et al. | 364/200 |
| 4,356,549 | 10/1982 | Chueh | 364/200 |
| 4,371,927 | 2/1983 | Wilhite et al. | 364/200 |
| 4,376,297 | 3/1983 | Anderson et al. | 364/200 |
| 4,398,245 | 8/1983 | Fujita | 364/200 |
| 4,400,770 | 8/1983 | Chan et al. | 364/200 |
| 4,541,045 | 9/1985 | Kromer, III | 364/200 |
| 4,561,052 | 12/1985 | Tateno | 364/200 |
| 4,737,909 | 4/1988 | Harada | 364/200 |

OTHER PUBLICATIONS

Wescon Technical Papers, Oct. 30,-Nov. 2, 1984, (Anaheim, Calif, Los Angeles, U.S.) A. Patel: "280,000 Memory Management and Cache Aspects", pp. 1-8.
IEEE Micro, vol. 5, No. 6, Dec. 1985, IEEE (New York, U.S.) K. A. El-Ayat et al.: "The Intel 80386-Architecture and Implementation", pp. 4-22.

Primary Examiner—Raulfe B. Zache
Assistant Examiner—Robert B. Harrell
Attorney, Agent, or Firm—Wilbert Hawk, Jr.; Floyd A. Gonzalez; Jack R. Penrod

[57] ABSTRACT

A device is described by this disclosure for performing memory stores in a memory of a computer system. The computer system includes a processor having a pipeline for processing commands in multiple stages; wherein the commands include a plurality of instructions, including store instructions, and virtual addresses. When the processor processes a store command, the pipeline is blocked until the associated virtual address is translated by a translation device to a real address. In the present device, if a selected store operation is processed, a check is made to see if the associated virtual address has previously been translated, and if it has, the pipeline is unblocked, thus enhancing the processing of store operations.

7 Claims, 6 Drawing Sheets

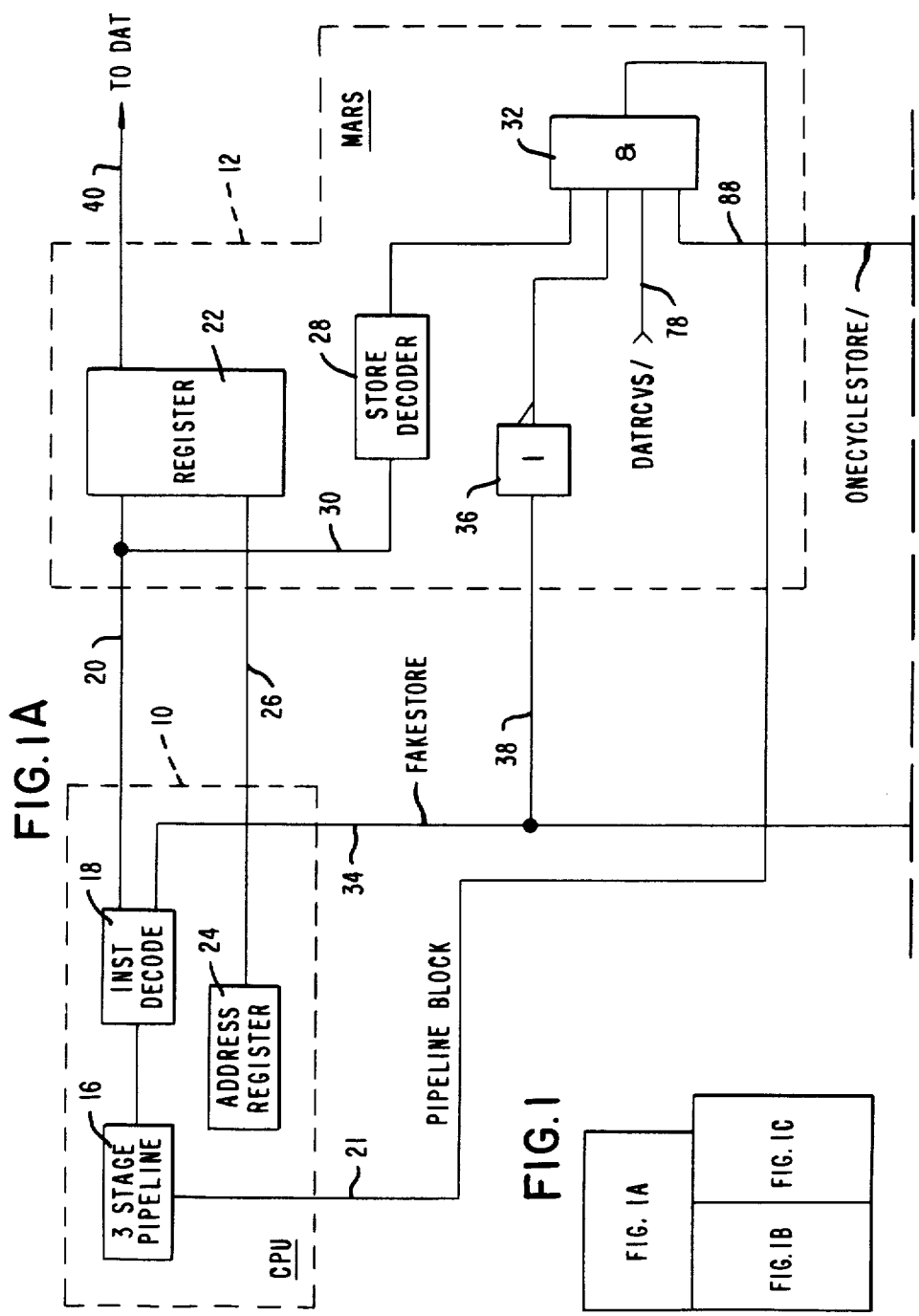

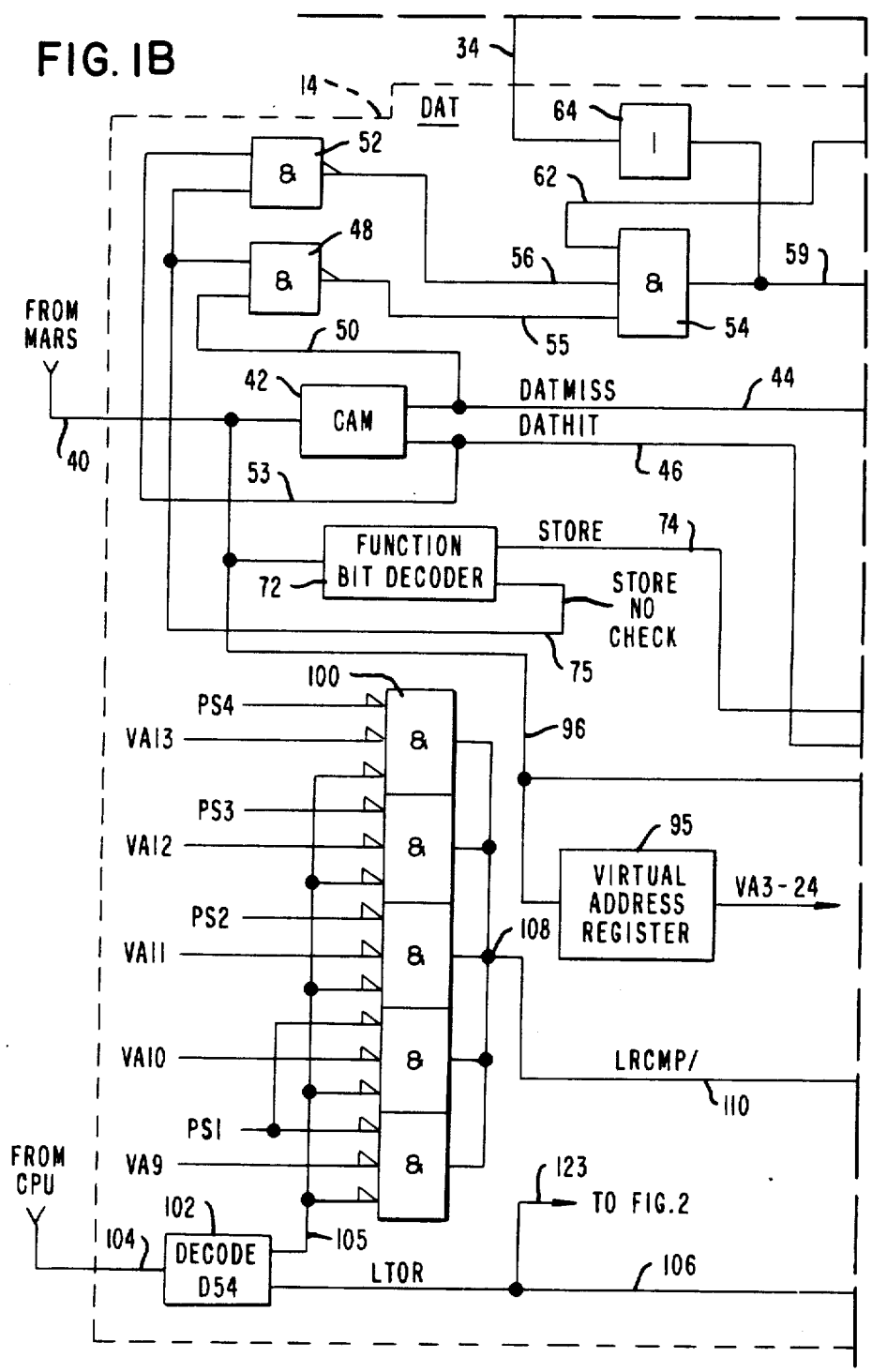
FIG. IB

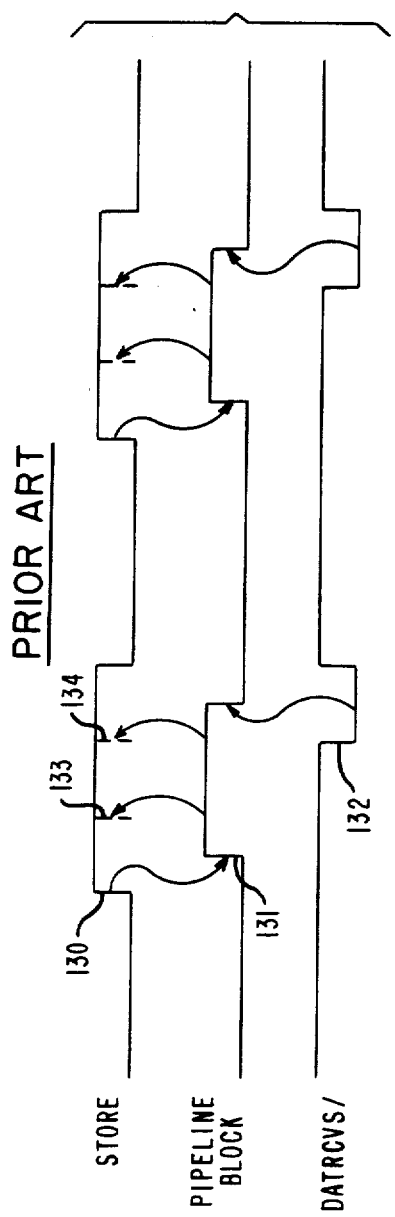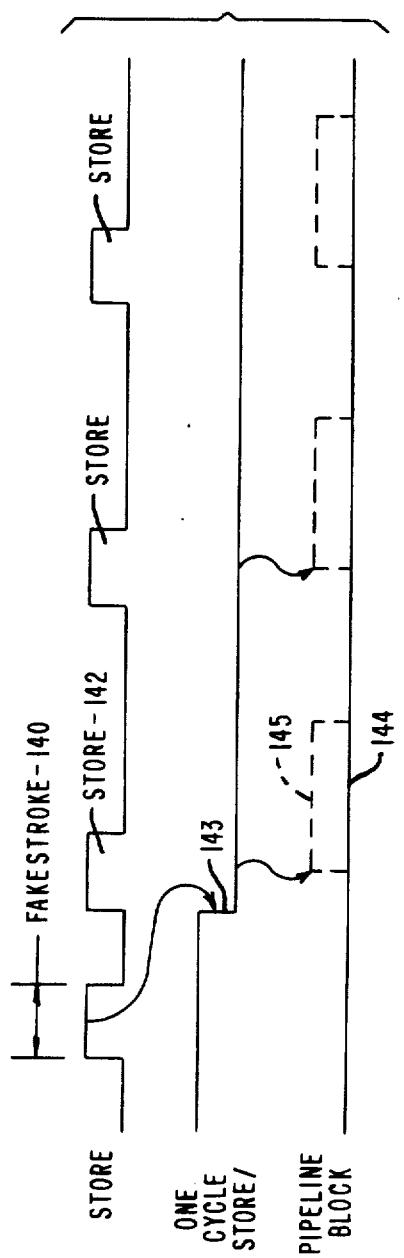

SINGLE CYCLE STORE OPERATIONS IN A VIRTUAL MEMORY

BACKGROUND OF THE INVENTION

The present invention is related to store operations in a virtual memory, and more particularly relates to providing single cycle store operations in a virtual memory of a data processing system.

In a data processing system including a central processor making stores to a virtual memory, the address of data to be stored in the memory must be translated from a virtual address to a real address. If the central processor has a pipeline, the pipeline must be blocked during the translation time. The present invention reduces store operations to only one cycle, thus improving the performance of move-type commands. This improvement can be from about twelve percent to about fifty percent, depending on the length of the field being moved. Since move-type commands are among the most frequently used commands, the optimization of these commands results in higher performance of the computer system.

U.S. Pat. No. 3,781,808 to Ahearn et al. for "Virtual Memory System", issued Dec. 25, 1973, discloses a virtual memory system having a Directory Look Aside Table for containing previously translated real addresses so that virtual addresses do not have to be translated over and over again.

U.S. Pat. No. 4,298,927 to Berglund et al. for "Computer Instructions Prefetch Circuit", issued Nov. 3, 1981, discloses a digital computer system including a main store, a virtual address translator, a microinstruction control unit and an instruction code prefetch circuit. The instruction code prefetch circuit retrieves the user instruction codes from the main store and holds them in a register until they are used. Designated microinstructions include commands which activate the instruction code prefetch circuit to retrieve the succeeding user instruction codes from the main store.

U.S. Pat. No. 4,332,010 to Messina et al. for "Cache Synonym Detection and Handling Mechanism", issued May 25, 1982, discloses a fast synonym detection and handling mechanism for a cache directory utilizing virtual addressing in data processing systems. Absolute addresses are translated from dynamic lookaside address translators, and a synonym detection circuit is used to interpret all directory compare signals to determine if a principal hit, a synonym hit or a miss occurred in the cache for each request.

U.S. Pat. No. 4,356,549 to Chueh for "System Page Table Apparatus", issued Oct. 26, 1982, discloses an apparatus for dynamically translating virtual memory addresses to real memory addresses, and includes a page fault circuit.

U.S. Pat. No. 4,376,297 to Anderson et al. for "Virtual Memory Addressing Device", issued Mar. 8, 1983, discloses a dynamic address translating unit for converting virtual or logical address values into real or physical address values.

U.S. Pat. No. 4,400,770 to Chan et al. for "Cache Synonym Detection and Handling Means", issued Aug. 23, 1983, discloses a device for eetecting and handling synonyms for a store-in-cache for fetching or storing operations.

SUMMARY OF THE INVENTION

In a specific embodiment, a device is disclosed for performing memory stores in a memory of a computer system wherein virtual addresses must be translated to real addresses. The device includes a processor having a pipeline for processing commands in multiple stages. The commands include a plurality of instructions, including store instructions, and virtual addresses, the pipeline being blocked by the store instructions. A first decoder is connected to the processor for decoding a selected store instruction of selected commands in a first selected stage of the pipeline, and for generating a first signal responsive to the decoded selected store instruction. A translation assist device receives virtual addresses in the pipeline of the processor and generates a second signal if a virtual address in a second selected stage of the pipeline has been previously translated to a real address. A pipeline controlling device is connected to said first decoder and the translation assist device for unblocking the pipeline in response to at least one of the first generated signal and the second generated signal.

An object of the present invention is to provide a memory assist device for a data processing system having a central processing unit and a virtual memory wherein store operations for selected commands are performed in one cycle.

It is another object of the present invention to provide a memory assist device for a data processing system having a central processing unit with a pipeline and a virtual memory wherein the pipeline is not blocked for selected store operations in which the virtual address has been previously translated.

It is another object of the present invention to provide a memory assist device for a dta processing system which performs one cycle memory store operations to a virtual memory until the central processing unit command is terminated, or an interrupt occurs, or a page boundary is about to be closed.

These and other objects of the present invention will become apparent from the description of the preferred embodiment and drawings herein.

BRIEF DESCRIPTION OF THE DRAWINGS

FIG. 1A is a portion of a schematic diagram of the store control circuit of the present invention;

FIG. 1B is another portion of the schematic diagram of the store control circuit of the present invention;

FIG. 1D diagramatically shows how FIGS. 1A, 1B, and 1C should be arranged to form a schematic diagram of the store control circuit of the present invention;

FIG. 3 is a timing diagram of a store operation in a control circuit of a prior art system;

FIG. 4 is a timing diagram of a store operation in the control circuit of the present invention;

DESCRIPTION OF THE PREFERRED EMBODIMENT

Figure 1C:
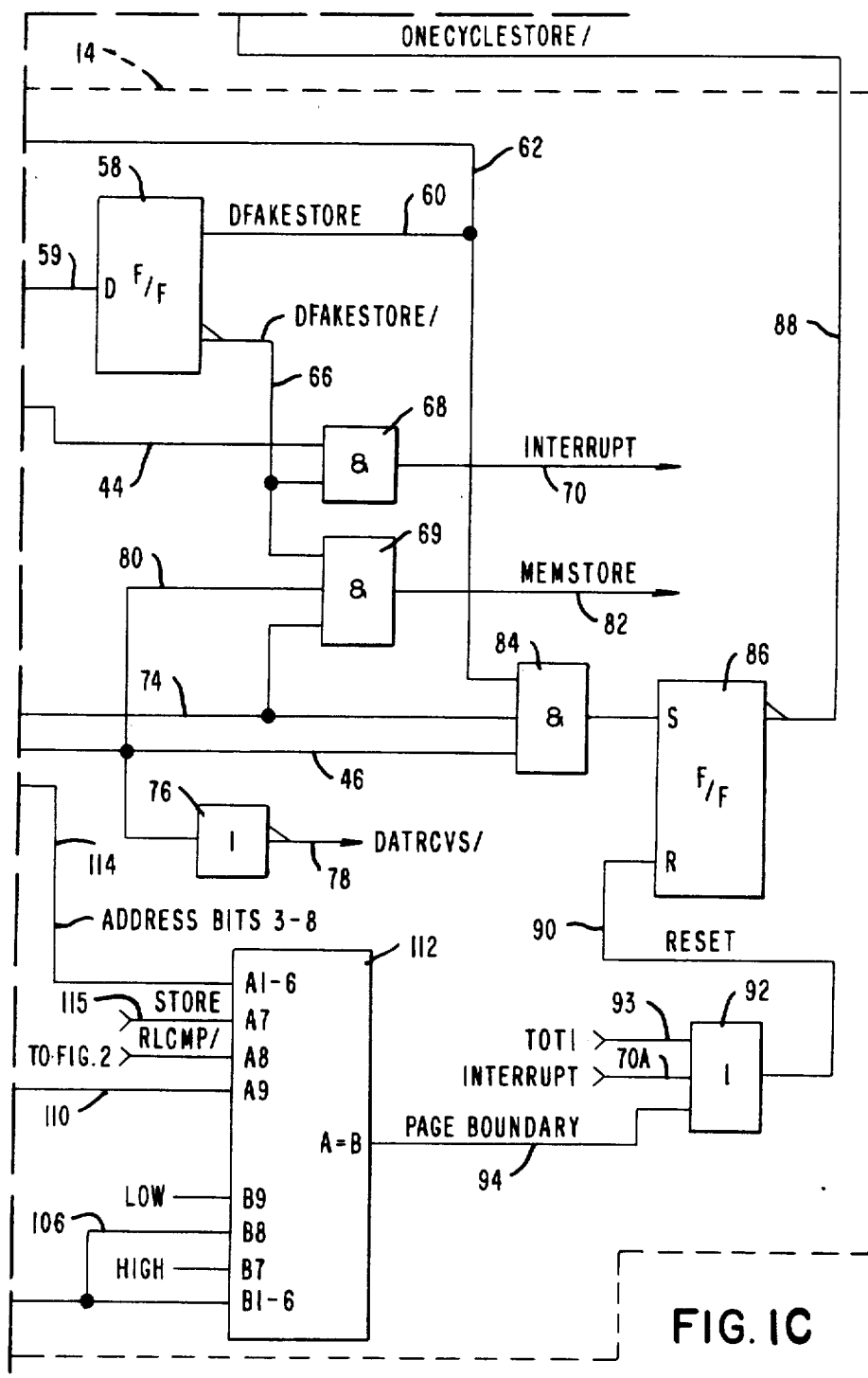
FIG. 1C is another portion of the schematic diagram of the store control circuit of the present invention.

FIGS. 1A, 1B and 1C, arranged as shown in FIG. 1, form a schematic diagram of the store control circuit of the present invention. The circuit includes a central processing unit (CPU) 10, a memory assist register set (MARS) 12 shown in FIG. 1A, and a dynamic address translations circuit (DAT) 14 shown in FIGS. 1B and 1C. The CPU 10 includes a microprocessor such as the NCR/32-000 central processing chip having a three stage pipeline represented by block 16, as fully explained in the publication "NCR/32 General Information," ST-2104-23 available from NCR Corporation, Dayton, Ohio. In the execution of various computer commands made up of a number of microinstructions, it is necessary to store data in the computer's main memory in a process well understood by those skilled in the art. In a virtual system, the virtual address of data to be stored in the memory must be translated to a real address before the data is actually stored. During this translation, the pipeline 16 must be blocked to give sufficient time to the translation hardware to finish its task. In the present invention, the disclosed circuit determines if the virtual address of data to be stored by certain commands at a later stage in the pipeline 16 has previously been translated. This predetermination is made before a store instruction of the desired commands is actually issued to the memory, such that when a store instruction is issued, the disclosed circuit already knows if a translation has occurred. If the translation has previously occurred, the pipeline is not blocked.

At this point, it is appropriate to distinguish between commands and instructions, as used herein. Commands, as used herein, are commands in a programming language which are each composed of a series of instructions. In this instance, the computer is executing NCR NEAT commands, each of which is broken down into a series of instructions. There are certain NEAT commands, identified herein as FAKESTORE commands, for which one cycle stores of data to memory are desired to enhance the operation of the computer. These NEAT commands are: Add Binary, Subtract Binary, Move Effective B-Address, Move B Right to Left, Move A Left to Right, and Move A Right to Left. Each of these FAKESTORE commands contain a special STORE-NO CHECK instruction having function bits 1011 which can be detected to initiate one cycle stores if the associated virtual address has been previously translated. In addition, the pipeline 16 remains unblocked for all store commands in the NEAT instruction following the STORE-NO CHECK command until an interrupt occurs, a page boundary is about to be crossed, or the FAKESTORE command is terminated.

The CPU 10 includes an instruction decode circuit 18 which decodes the NEAT command being issued to detect a FAKESTORE command and the function bits of the associated instructions to detect a STORE-NO CHECK instruction. The CPU 10 transmits all command instructions over a bus 20 to a register pair 22 in the MARS 12, in the usual way. An address register 24 also contains the virtual address of data to be stored in the computer's main memory (not shown). The virtual address is transmitted by the CPU 10 from the address register 24 to the register pair 22 over a bus 26. As explained in the aforementioned "NCR/32 General Information" manual, the MARS 12 consists of paired registers in a register storage unit (not shown) for use by the CPU 10 in memory operations, as is well understood. The function bits of the instruction on bus 20 is passed to a store decoder circuit 28 over bus extension 30 for decoding. An output of the store decoder 28 is connected to one input of an AND gate 32 and is enabled high when any store in any command is detected. Thus, the pipeline 16 is blocked in the normal way for all store instructions except those in the FAKESTORE commands, as will be explained.

When the instruction decode circuit 18 of the CPU 10 detects a STORE-NO CHECK instruction in a FAKESTORE command, an output connected to conductor 34 issues a high FAKESTORE signal. An inverter 36 has its input connected to a conductor 38, which is connected to the FAKESTORE conductor 34, and has its output connected to one input of the AND gate 32. Other inputs of the AND gate 32 receive a DAT receive store (DATRCVS/) signal over a conductor 78, and a one cycle store (ONECYCLESTORE/) signal over a conductor 88, to be discussed. It will be understood that when the FAKESTORE signal is inverted from a high to a low by inverter 36, the output of the AND gate 32 will go low, unblocking the pipeline 16 by a low PIPELINE BLOCK signal on a conductor 21 connected between the output of the AND gate 32 to the pipeline 16 of the CPU 10. As previously mentioned, store instructions from commands other than FAKESTORE commands cause the output of the store decoder circuit 28 to go high, blocking the pipeline 16 in the normal manner.

Referring to FIG. 1B, the FAKESTORE conductor 34 is connected to a logic buffer device 64, whose output is wire ORed, with the output of an AND gate 54, to a conductor 59. Referring to FIG. 1C, the conductor 59 is connected to the D terminal of a D-type flip-flop 58. The non-inverted output of the flip-flop 58 is connected to a DFAKESTORE conductor 60, which is in turn is connected to a conductor 62 for feeding back the DFAKESTORE signal to an input of the AND gate 54 of FIG. 1B. Thus, a high on the conductor 59 will set the non-inverted output of the flip-flop 58 high, which will cause the output of the AND gate 54 to go high, assuming its other inputs are also high.

A bus 40 is connected from the register 22 of the MARS 12 to the inputs of a content addressable memory (CAM) 42 in the DAT 14. At this point, it must be remembered that the virtual address being presented from the MARS 12 to the CAM 42 over bus 40, is the virtual address which was issued earlier from the pipeline 16. Thus, when the FAKESTORE signal goes high, the previous virtual address is being checked by the CAM 42.

The CAM 42 has a DATMISS output connected to a conductor 44 which is normally low and goes high when the virtual address from bus 40 does not match data in the CAM 42, and a DATHIT output connected to a conductor 46 which is normally low and goes high when the virtual address from bus 40 matches data in the CAM 42. A function bit decoder 72 is included which decodes the instruction function bits for all commands on the bus 40 from the MARS 12. The decoder 72 has a STORE output connected to conductor 74 which is normally low and which goes high when a store instruction is detected, and a STORE-NO CHECK output connected to conductor 75 which is normally low and which oes high when a STORE-NO CHECK instruction is detected.

The STORE-NO CHECK line 75 is connected to the respective inputs of NAND gates 48 and 52. The other input of NAND gate 48 is connected to the DATMISS conductor 44, and the other input of NAND gate 52 is connected to the DATHIT conductor 46. Outputs of the NAND gates 48 and 52 are connected to inputs of AND gate 54 by conductors 55 and 56, respectively. It will thus be understood that the flip-flop 58 of FIG. 1C will be set when a high FAKESTORE signal is issued, and the flip-flop 58 will remain set until the function bit decoder 72 detects a STORE-NO CHECK instruction before either a DATHIT or a DATMISS is issued by the CAM 42. The NAND gates 48 and 52 are used to achieve the correct timing. The output of one of the NAND gates 48 or 52 will not go low until after either one of the DATHIT or the DATMISS signal goes high while the STORE-NO CHECK signal is also high. When the output of either of the NAND gates 48 or 52 goes low, the output of the AND gate 54 will go low, resetting the flip-flop 58, which will remain reset until it is again set by a high FAKESTORE signal on conductor 34. It will be noted that the STORE-NO CHECK instruction in the CPU stages of the pipeline will set the flip-flop 58 as explained, and that the same STORE-NO CHECK instruction in the DAT stages of the pipeline will reset the flip-flop 58.

Referring to FIG. 1C, the inverted output of flip-flop 58 labeled DFAKESTORE/, is connected via a conductor 66 to the respective inputs of AND gates 68 and 69. The other input of the AND gate 68 is connected to the DATMISS conductor 44, and its output is connected to an INTERRUPT conductor 70. Thus, when the flip-flop 58 is reset, a DATMISS causes a high INTERRUPT signal on conductor 70.

A second input of the AND gate 69 is connected to the DATHIT conductor 46 via a conductor 80, and a third input is connected to the STORE conductor 74. The output of the AND gate 69 is connected to a MEMSTORE conductor 82. It will thus be seen that when the flip-flop 58 is reset and a DATHIT occurs while the STORE signal is high, that a high MEMSTORE signal will be placed on the MEMSTORE conductor 82. The use of INTERRUPT and MEMSTORE signals in the control of computer memories are well understood, and will not be discussed further.

The DFAKESTORE signal on the conductor 62 from the non-inverted output of the flip-flop 58 is connected to one input of an AND gate 84. A second input is connected to the STORE conductor 74, and a third input is connected to the DATHIT conductor 46. The output of the AND gate 84 is connected to the set input S of a set-reset flip-flop 86. The inverted output of the flip-flop 86 is connected to the ONECYCLESTORE/ signal conductor 88, which is connected to one input of the AND gate 32 of FIG. 1A. It will thus be understood that the flip-flop 86 is set when the flip-flop 58 is set and a DATHIT has occurred as the result of a STORE. When the flip-flop 86 is set, the ONECYCLESTORE/ signal on conductor 88 goes low, thus making the output of the AND gate 32 low and unblocking the pipeline 16. An inverter 76 has its input connected to the DATHIT conductor 46, and its output provides the DATRCVS/ signal over conductor 78 to the AND gate 32. Thus, the DATCVS/ signal will unblock the pipeline for all DATHIT's, but the ONECYCLESTORE/ signal will hold the pipeline unblocked only if the flip-flop 86 is set by a FAKESTORE command, as explained.

The reset input R of the flip-flop 86 is connected by a line 90 to the output of an OR gate 92 whose inputs are connected to a TOT1 signal conductor 93, an INTERRUPT signal conductor 70A and a PAGE BOUNDARY signal conductor 94. The TOT1 signal on conductor 93 is a status bit which is used to reset the flip-flop 86 at the beginning of each NEAT command. Thus, when the CPU 10 starts processing a new command, the TOT1 signal is enabled such that the flip-flop 86 is reset. The flip-flop 86 is also reset upon the receipt of an INTERRUPT signal over line 70A, which is the same INTERRUPT signal outputted by the AND gate 68 over line 70. Also, the flip-flop 86 is reset whenever a page boundary is about to be passed as indicated by a PAGE BOUNDARY signal transmitted over line 94, as will be explained.

A virtual address register 95 of FIG. 1B is connected to bus 96, which is in turn connected to bus 40 from the MARS 12 for receiving a virtual address. The virtual address register receives virtual address bits 3 through 24 for transmission to a translation circuit and storage in a cache, as appropriate. The translation of a virtual address and its storage in a cache is well understood in the art, and does not form a part of this invention, and will not be explained further.

The page boundary protection circuit shown in FIGS. 1B, 1C and FIG. 2 will now be explained. Virtual address register bits VA9 through VA13 from the address register 24 of the CPU are transmitted over a bus (not shown) to the input of a NAND logic array 100 for comparison with page size bits PS1 through PS4. The page size bits PS1-PS4 are coded to indicate the page size of the virtual address pages into which the main memory (not shown) is divided. If the page size is 256 bytes, bits PS1-PS4 are turned on to their one states. If the page size is 1,024 bytes, bits PS2-PS4 are turned on to their one states, and PS1 is turned off to its zero state. If the page size is 2,048 bytes, PS3 and PS4 are turned on to their one states, and PS1 and PS2 are turned off to their zero states. If the page size is 4,096 bytes, PS4 is turned on and PS1-PS3 are turned off. If the page size is 8,192 bytes, the bits PS1-PS4 are turned off to their zero states.

A decode circuit 102 receives the function bits over bus 104 from the CPU 10 of FIG. 1A. The function bits are those which are transmitted over bus 20 from the CPU 10 to the MARS 12. The decode circuit 102 may be incorporated into the instruction decode circuit 18 of the CPU 10, and a direction bit transmitted to the DAT 14, or a separate decode circuit 102 may be incorporated in the DAT as shown. The decode circuit 102 decodes the NCR NEAT command Move A Left to Right (command D54) to determine the direction that the virtual address from the CPU 10 will be incremented during the execution of the command. The output on conductor 105 is high when the direction is from right to left, and is low when the direction is left to right. The output on conductor 106 is high when the direction is from left to right and low when the direction is from right to left. Thus, it will be understood that when the direction is left to right, the NAND gates of the NAND gate array 100 will be enabled by a low on conductor 105.

The outputs of the NAND gate array 100 are wire ORed together at a node 108. It will thus be understood that if any one or more of the outputs of the NAND gates of the NAND gate array 100 go high, then the signal at 108 will also go high. The node 108 is connected to conductor 110 for providing a left to right compare signal (LRCMP/) to a one input of a comparator 112 of FIG. 1C.

The inputs A1–A6 of the comparator 112 are connected to address bits 3–8 of the virtual address transmitted over address bus 114 from the address bus 96 of FIG. 1B. The STORE signal outputted by the function bit decoder 72 of FIG. 1B is inputted to comparator input A7 over conductor 115 which is connected to conductor 74, a right to left compare (RLCMP/) signal, which is high when the LTOR signal on conductor 106 is high (as will be explained in connection with FIG. 2), is inputted to input A8 of the comparator 112, and the LRCMP/ signal on conductor 110 is inputted to input A9 of comparator 112.

A low is inputted into input B9 of comparator 112, the LTOR signal on conductor 106 is inputted into input B8, a high is inputted into input B7, and the LTOR signal on conductor 106 is also inputted into each of the inputs B1 through B6 of comparator 112. It will be noted that virtual address bits VA9—VA13 presented to the NAND gate array 100 comes from the virtual address register 24 of the CPU 10 of FIG. 1A, while the virtual address bits 3–8 presented to inputs A1–A6 of the comparator 112 come from the virtual address from the MARS 12 of FIG. 1A. Thus, lhe NAND gate array 100 is comparing the page number of the virtual address from the CPU to determine if a page boundary has been crossed by the virtual address in the CPU stages of the pipeline, while the address bits compared by the comparator 112 are for the previous address in the MARS stages of the pipeline. Since the addresses are being incremented up when the operation is from left to right, the signal on the LTOR conductor 106, which is high when the operation is from left to right, are inputted into B1–B6 of the comparator 112. Thus the comparator 112 is able to determine if a page boundary is about to be crossed before the boundary is actually crossed. This will be indicated when all of the address bits 3–8 on bus 114 are high and the LRCMP/ signal from the NAND array 100 is low.

As previously explained, an equal compare by comparator 112 will cause the PAGE BOUNDARY signal on conductor 94 to go high enabling the OR gate 92 and resetting the flip-flop 86.

Figure 2:
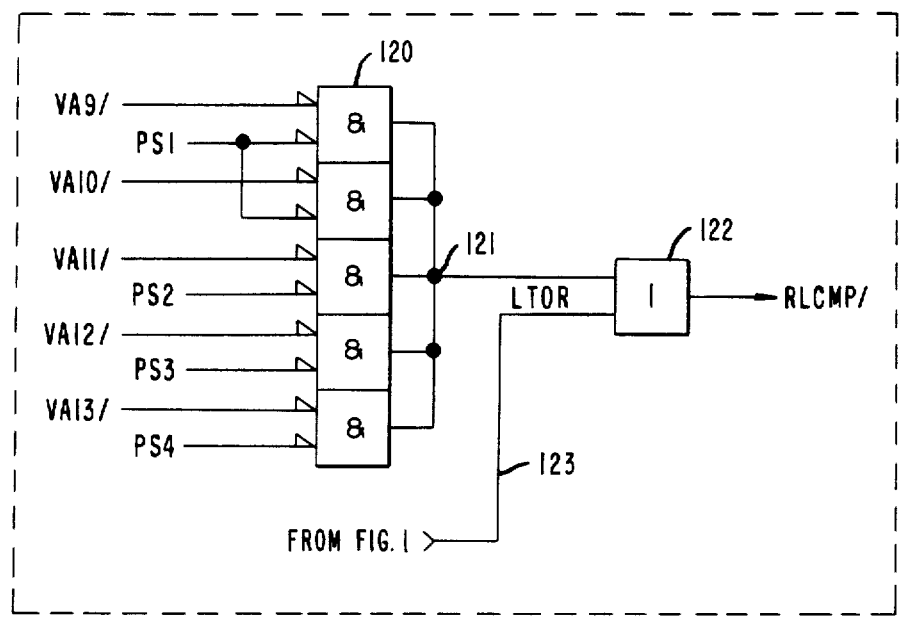
FIG. 2 is a schematic diagram of a portion of the page boundary detect circuit of the store control circuit of FIGS. 1A, 1B and 1C.

Turning to FIG. 2, a NAND gate array 120 is provided whose outputs are wire ORed at node 121. The negative virtual address bits VA9/-VA13/ are presented to the NAND gates of array 120 with the page size bits PS1-PS4 to perform a subtraction function to determine if the page size portion of the virtual address from the CPU 10 has decreased to below the present page. The LTOR signal is transmitted via conductor 123 from the conductor 106 of FIG. 1B to one input of an OR gate 122. Thus when the LTOR signal on conductors 106 and 123 is low, the OR gate 122 is partially enabled. When all of the NAND gate outputs of the NAND gate array 120 go low, the right to left compare signal (RLCMP/) also goes low to indicate that a page boundary in the right to left operation is about to be crossed. The LTOR signal on conductor 106 will be low when the direction is right to left such that the inputs B1-B6 of comparator 112 of FIG. 1C are also low. It will thus be understood that the circuit of FIG. 2 determines when a page boundary is about to change in the negative direction, and the comparator 112 looks to see if all of the bits of the address from the MARS 12 are all zeros indicating that a page boundary is about to change.

As previously explained, the OR gate 92 (FIG. 1C) may be enabled to reset the flip-flop 86 whenever the NCR NEAT command is about to change, as indicated by a high TOT1 signal on conductor 93, or if a high INTERRUPT signal is received over conductor 70A, or if a page boundary changes indicated by a high PAGE BOUNDARY signal over conductor 94. Any of these conditions, alone or in combination, will cause the ONECYCLESTORE/ signal on conductor 88 to go high, causing the output on AND gate 32 (FIG. 1A) to go high thereby blocking the three stage pipeline 16.

FIG. 3 is a timing diagram of a memory store operation wherein the store takes three cycles. The operation of FIG. 3 shows the normal operation of a memory store without the present invention. In the prior art, a store command 130 caused a pipeline block at 131 until a DATRCVS/ signal was received at 132 to indicate that the STORE command had been received by the DAT, and that the virtual address also received in the DAT produced a DATHIT by the CAM. This operation took three cycles as shown at 130, 133 and 134. Three cycle stores thus were performed for each memory store operation performed by the MARS.

FIG. 4 is a timing diagram showing a STORE operation with the present invention. When a STORE-NO CHECK instruction for a FAKESTORE command is decoded by the instruction decode circuit 18 of the CPU 10 of FIG. 1A, a FAKESTORE signal is issued over conductor 34. This FAKESTORE signal is shown in FIG. 4 at 140. The CAM 42 of the DAT 14 of FIG. 1B compares the virtual address on conductor 40 from the MARS 12 of FIG. 1A with itscontents, resulting in a DATHIT on conductor 46 when the virtual address has been previously translated. A high STORE signal from the function bit decoder 72 of the MARS 14 (shown at 142 of FIG. 4) which is concurrent with a DATHIT signal on conductor 46 and a DFAKESTORE signal on conductor 62 (caused by the FAKESTORE signal on conductor 34 as previously explained) results in a ONECYCLESTORE/ signal at 143 of FIG. 4. The ONECYCLESTORE/ signal on conductor 88 of FIG. 1C inhibits the AND gate 32 of FIG. 1A thereby disabling the PIPELINE BLOCK signal on conductor 21. The PIPELINE BLOCK signal (see 144 of FIG. 4) stays low until the flip-flop 86 is reset. The STORE cycle is shown in phantom at FIG. 145 of FIG. 4. One cycle store operations are performed for as long as the ONECYCLESTORE/ signal remains low. As previously discussed, one cycle stores will continue throughout the present NCR NEAT command until a page boundary is crossed, a DATMISS occurs causing an interrupt, or until the NCR NEAT command is terminated.

Figure 5:
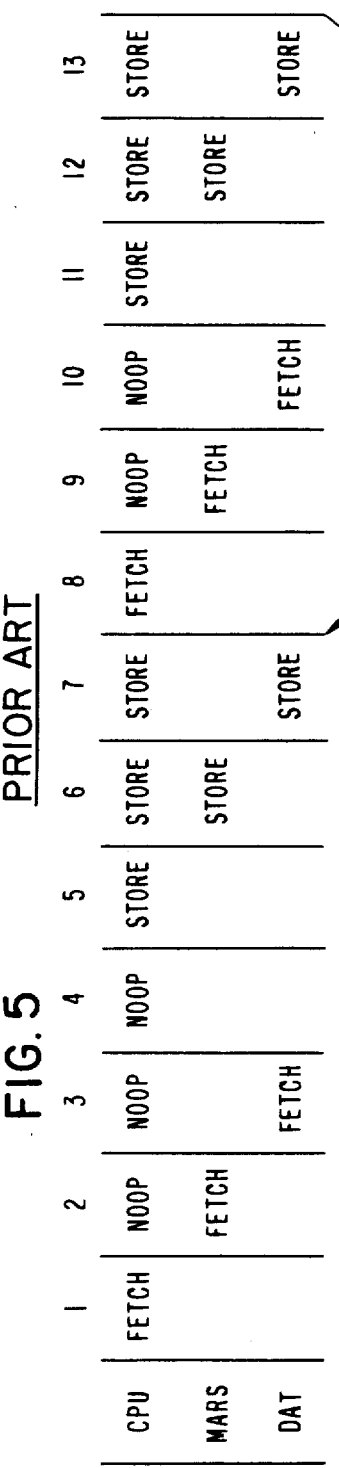
FIG. 5 is an illustration of the cycles of a fetch and store operation of the pipeline of a prior art system.

FIG. 5 is a timing diagram showing the cycles of the CPU, MARS, and DAT pipeline of a prior art system. In FIG. 5, a fetch instruction is issued by the CPU in cycle 1, the fetch instruction moves down the pipeline to the MARS in cycle 2 while the CPU performs a no-operation. The fetch instruction then moves to the DAT in cycle 3 while the CPU continues in a no-operation mode. In cycle 4, the CPU again performs a no-operation waiting for the instruction to be completed. In cycle 5, the CPU issues a store instruction. In cycle 6, the store instruction moves from the CPU to the MARS and the CPU stays blocked in the store mode. In cycle 7, the store instruction moves to the DAT and the CPU remains in the store mode. Now that the store has been completed, the CPU may issue a second fetch instruction which moves to the MARS in cycle 9, and the DAT in cycle 10. The three cycle store is then repeated in cycles 11, 12 and 13. The fetch and store sequence is then repeated in a loop until the T-count is expired indicating that the NEAT command has been completed, as is known in the art.

Figure 6:
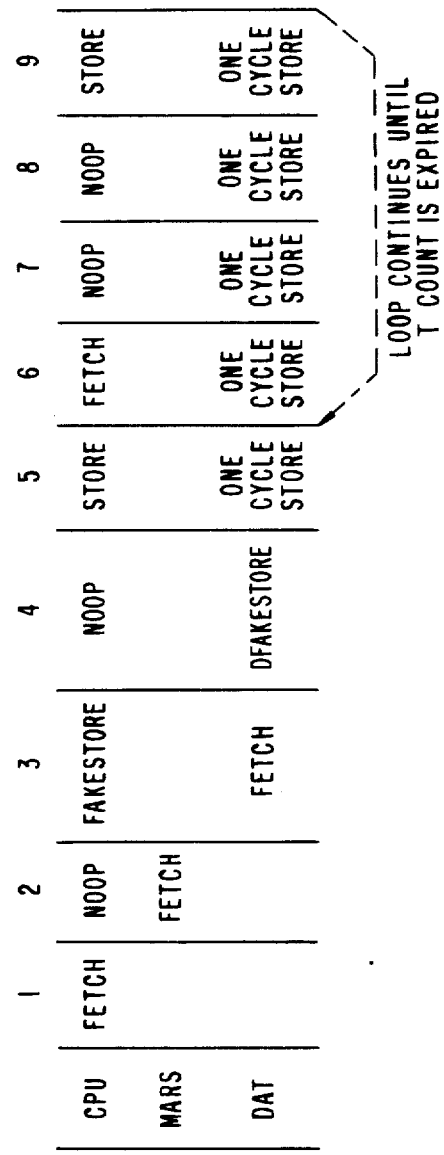
FIG. 6 is an illustration of the cycles of a fetch and store operation of the pipeline of a system using the present invention.

FIG. 6 shows the fetch and store sequence using the present invention. In cycle 1 of FIG. 6, the CPU issues a fetch instruction. In cycle 2, the fetch instruction moves to the MARS, and the CPU performs a no-operation. In cycle 3, a FAKESTORE signal is issued by the instruction decoder 18 of the CPU 10, and the fetch instruction moves to the DAT. In cycle 4, the CPU performs a no-operation and a DFAKESTORE signal is issued by the flip-flop 58 of the DAT 14. If the address from the MARS to the CAM 42 of the DAT 14 produces a DATHIT signal, a ONECYCLESTORE/ signal is issued by the DAT 14 unblocking the pipeline such that the CPU 10 may complete the STORE in one cycle. The CPU 10 then issues a fetch instruction in cycle 6 and the ONECYCLESTORE/ signal remains enabled as previously discussed. It will be noted in FIG. 6 that three cycles are needed to complete a fetch operation but only one cycle is needed to complete a store operation, thus shortening the time needed to complete a fetch and store operation. The fetch and store loop continues until the T-count is expired, but the number of cycles to complete a fetch and store operation is shortened from six cycles to four.

Thus, a system has been described which provides the aforementioned objects. It will be understood by those skilled in the art that the disclosed embodiment is exemplary only, and that the various elements disclosed may be replaced by equivalents without departing from the invention hereof, which equivalents are covered by the appended claims.

What is claimed is:

1. A device for performing memory stores in a memory of a computer system wherein virtual addresses must be translated to real addresses, said device comprising:
   processor means having a pipeline for processing commands in multiple stages, said commands including a plurality of instructions, including store instructions, and virtual addresses, said pipeline being blocked by the store instructions;
   first decode means connected to said processor means for generating a first signal in response to a decoding of a selected store instruction of selected commands in a first selected stage of said pipeline;
   translation assist means including input means for receiving virtual addresses in the pipeline of said processor means, said translation assist means for generating a second signal if a virtual address in a second selected stage of said pipeline has been previously translated to a real address;
   pipeline controlling means connected to said first decode means and said translation assist means, said pipeline controlling means for unblocking said pipeline in response to at least one of said first signal and said second signal; and
   second decode means connected to said processor means for generating a third signal in response to a decoding of every store instruction from said processor means; and
   wherein said pipeline controlling means includes first logic means having a first input connected to said first decode means for receiving said first signal, a second input means connected to said translation assist means for receiving said second signal, and a third input connected to said second decode means for receiving said third signal, said first logic means for blocking said pipeline for every store instruction decoded by said second decode means except when said first decode means decodes said selected store instruction.

2. The device of claim 1 further comprising:
   memory controlling means for issuing memory store commands to the memory of the computer system; and
   resettable means connected to said processor means and said memory controlling means, said resettable means for being set to block an issuing of memory store commands from said memory controlling means in response to said first signal.

3. The device of claim 2 further comprising:
   third decode means in said translation assist means connected to said input means and said resettable means, said third decode means for decoding said selected store instruction in said second selected stage of said pipeline means and responsive thereto for resetting said resettable means such that said memory controlling means is unblocked.

4. The device of claim 3 further comprising:
   page boundary means connected to said processor means and said pipeline controlling means for generating a page boundary signal when a virtual address in a previous part of the pipeline of said processor means will cross a page boundary, and second logic means responsive to said page boundary signal for blocking the pipeline of said processor means upon receipt of said page boundary signal.

5. The device of claim 4 wherein said second logic means includes OR gate means having a first input connected to said page boundary means, a second input connected to an interrupt means for providing an interrupt signal when said translation assist means determines that a virtual address in said pipeline has not been previously translated to a real address, and a third input connected to a termination means for providing a termination signal when a command being executed by said processor means is terminated, said OR gate means disabling said pipeline controlling means for blocking the pipeline of said processor when said OR gate means receives at least one of said page boundary signal, said interrupt signal and said termination signal.

6. The device of claim 5 wherein said third decode means includes means for generating a fourth signal upon a decoding of any store instruction on said input means; and
   wherein said pipeline controlling means includes AND gate means having a first input connected to said resettable means for receiving a first enabling signal when said resettable means is set, a second input for being enabled by said second generated signal, and a third input connected to said third decode means for being enabled by said fourth generated signal, and an output for generating a pipeline unblocking signal when all of its first, second and third inputs are enabled.

7. The device of claim 6 wherein said OR gate means is connected to said second resettable means such that the output of said OR gate resets said resettable means.

* * * * *

UNITED STATES PATENT AND TRADEMARK OFFICE
CERTIFICATE OF CORRECTION

PATENT NO. : 4,797,817
DATED : January 10, 1989
INVENTOR(S) : Chinh K. Nguyen et al.

It is certified that error appears in the above-identified patent and that said Letters Patent is hereby corrected as shown below:

Column 10, line 59, delete "generated".

Column 10, line 62, delete "generated".

Column 10, line 66, delete "second".

Signed and Sealed this

First Day of August, 1989

Attest:

DONALD J. QUIGG

Attesting Officer

Commissioner of Patents and Trademarks